US006776745B2

(12) United States Patent
Nakashima et al.

(10) Patent No.: US 6,776,745 B2
(45) Date of Patent: Aug. 17, 2004

(54) TONER SUPPLY ROLLER

(75) Inventors: Masayuki Nakashima, Higashiosaka (JP); Toru Nishino, Neyagawa (JP); Takeo Taniguchi, Hirakata (JP); Ikuo Nishiyama, Susono (JP)

(73) Assignees: Nitto Kogyo Co., Ltd., Tokyo (JP); Kurabo Industries Ltd., Kurashiki (JP)

(*) Notice: Subject to any disclaimer, the term of this patent is extended or adjusted under 35 U.S.C. 154(b) by 0 days.

(21) Appl. No.: 10/349,070

(22) Filed: Jan. 23, 2003

(65) Prior Publication Data

US 2003/0153444 A1 Aug. 14, 2003

(30) Foreign Application Priority Data

Jan. 24, 2002 (JP) ....................................... 2002-015860
Jun. 25, 2002 (JP) ....................................... 2002-184604

(51) Int. Cl.$^{7}$ ................................................ B23P 15/00
(52) U.S. Cl. ............................ 492/56; 492/53; 492/59; 399/281; 399/283
(58) Field of Search ............................ 492/56, 53, 59; 118/653, 656; 399/273, 272, 274, 275, 283, 281

(56) References Cited

U.S. PATENT DOCUMENTS

| | | | | | |
|---|---|---|---|---|---|
| 5,062,385 | A | * | 11/1991 | Nishio et al. | 399/284 |
| 5,220,129 | A | * | 6/1993 | Nishio et al. | 399/284 |
| 5,666,620 | A | * | 9/1997 | Kobayashi | 399/273 |
| 5,954,910 | A | * | 9/1999 | Kikukawa et al. | 156/307.1 |
| 6,026,265 | A | * | 2/2000 | Kinoshita et al. | 399/281 |
| 6,143,675 | A | * | 11/2000 | McCollam et al. | 442/221 |
| 6,345,166 | B1 | * | 2/2002 | Sakaizawa et al. | 399/283 |
| 2003/0153444 | A1 | * | 8/2003 | Nakashima et al. | 492/56 |

FOREIGN PATENT DOCUMENTS

JP 2000-334756 * 5/1999

* cited by examiner

*Primary Examiner*—I Cuda-Rosenbaum
(74) *Attorney, Agent, or Firm*—Westerman, Hattori, Daniels & Adrian, LLP

(57) ABSTRACT

A toner supply roller comprises a metallic core shaft and an electrically conductive elastic layer formed to surround the outer surface of the shaft. The conductive elastic layer is formed of open-cell polyurethane foam. The polyurethane foam is impregnated with an electrically conductive polymer and a binder.

10 Claims, 2 Drawing Sheets

TONER SUPPLY ROLLER

CROSS-REFERENCE TO RELATED APPLICATIONS

This application is based upon and claims the benefit of priority from the prior Japanese Patent Applications No. 2002-15860, filed Jan. 24, 2002; and No. 2002-184604, filed Jun. 25, 2002, the entire contents of both of which are incorporated herein by reference.

BACKGROUND OF THE INVENTION

1. Field of the Invention

The present invention relates to a toner supply roller used in an image forming apparatus of a toner developing system such as a copying machine, a facsimile machine or a laser beam printer.

2. Description of the Related Art

An image forming apparatus of a toner developing system comprises in general a photosensitive drum, an electrostatic latent image forming means for forming an electrostatic latent image on the photosensitive drum, a developing roller rotated in direct contact with or close to the photosensitive drum, a toner supply roller for supplying toner to the developing roller, and a toner regulating member for regulating the toner supplied onto the developing roller to a uniform thickness. Fist, an electrostatic latent image is formed on the surface of the photosensitive drum by the electrostatic latent image forming means, based on prescribed picture image information. On the other hand, toner is supplied onto the surface of the developing roller by the toner supply roller. The toner supplied onto the developing roller is regulated by the toner regulating member to a uniform thickness so as to form a thin toner layer of a uniform thickness on the surface of the developing roller. The developing roller having the thin toner layer of a uniform thickness formed on the surface permits the toner to be attached successively to the electrostatic latent image formed on the photosensitive drum in the nip portion, or in the vicinity thereof, between the photosensitive drum and the developing roller, thereby achieving toner development.

The toner supply roller used in the image forming apparatus of the toner developing system described above comprises a metallic core shaft and an electrically conductive elastic layer formed on the outer surface of the shaft. In the prior art, the conductive elastic layer has been formed by dispersing an electrically conductive carbon used as an electrically conductive material into a resin foam such as a polyurethane foam by kneading. However, in the case of preparing a toner supply roller having a generally required surface resistance of $10^6$ to $10^{10}$ Ω by using an electrically conductive carbon, the conductive carbon fails to be dispersed uniformly into the resin material. As a result, the surface resistance is rendered nonuniform depending on the lot, depending on the roller in the same lot, or depending on the site of the same roller. Thus, it has been difficult to manufacture a toner supply roller having a nonuniformity in the surface resistance lower than 10%.

Therefore, it is an object of the present invention to provide a toner supply roller comprising an electrically conductive elastic layer exhibiting a substantially uniform surface resistance.

BRIEF SUMMARY OF THE INVENTION

According to a first aspect of the present invention, there is provided a toner supply roller comprising a core shaft and an electrically conductive elastic layer formed on a outer peripheral surface of the shaft, the conductive elastic layer comprising an open-cell polyurethane foam, wherein an electrically conductive polymer and a binder are attached to cell walls of the polyurethane foam.

According to a second aspect of the present invention, there is provided toner supply roller comprising a core shaft and an electrically conductive elastic layer formed on a outer peripheral surface of the shaft, the conductive elastic layer comprising an open-cell polyurethane foam, wherein an electrically conductive polymer and a binder are attached to cell walls of the polyurethane foam, and the polyurethane forming the polyurethane foam is exposed to the outer circumferential surface of the conductive elastic layer.

Further, according to a third aspect of the present invention, there is provided a method of manufacturing a toner supply roller, comprising impregnating a block of open-cell polyurethane foam with an impregnating solution containing an electrically conductive polymer and a binder, attaching the conductive polymer and the binder to cell walls of the polyurethane foam, followed by drying the impregnated polyurethane foam; inserting a core shaft into the block of dried polyurethane foam; and polishing the outer surface of the block of polyurethane foam so as to form a circumferential surface.

The conductive polymer used in the present invention may be selected from a polyaniline-based polymer, a polyaniline sulfonic acid-based polymer, a polypyrrol, a polyacetylene and a mixture thereof.

The binder used in the present invention may be selected from acryl-based resin such as an acrylic resin, a polyacrylic acid ester resin, an acrylic acid-styrene copolymer resin or an acrylic acid-vinyl acetate copolymer resin, a polyvinyl alcohol, a polyacrylamide, a polyvinyl chloride resin, a urethane resin, a vinyl acetate resin, a butadiene resin, an epoxy resin, an alkyd resin, a melamine resin, a chloroprene rubber and a mixture thereof.

In the present invention, it is desirable for the conductive polymer and the binder to be contained in the cells, and attached to the cell walls, of the polyurethane foam in a total amount of 5 to 18% by weight based on the weight of polyurethane foam. Also, it is desirable for the weight ratio of the binder to the conductive polymer to fall within a range of 0.1 to 10.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the present invention, and together with the general description given above and the detailed description of the preferred embodiments given below, serve to explain the principles of the present invention.

DETAILED DESCRIPTION OF THE INVENTION

The present invention will now be described in more detail with reference to the accompanying drawings.

Figure 1:
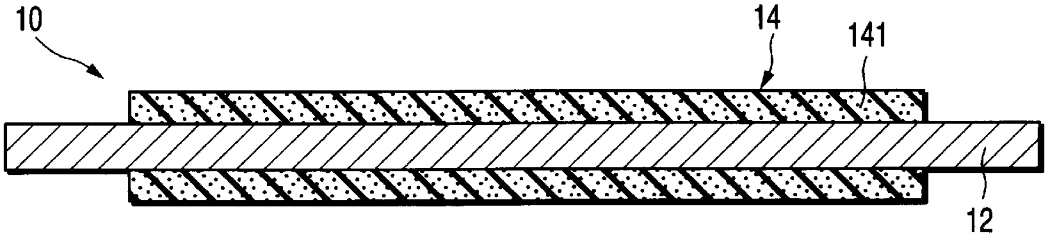
FIG. 1 is a cross-sectional view schematically exemplifying a construction of a toner supply roller according to one embodiment of the present invention.

FIG. 1 is a cross-sectional view schematically illustrating a construction of a toner supply roller 10 according to an embodiment of the present invention. As shown in FIG. 1, the toner supply roller 10 comprises a columnar metallic core shaft 12 and an electrically conductive elastic layer 14 surrounding the outer surface of the core shaft 12 except both edge portions of the core shaft 12. Needless to say, the conductive elastic layer 14 is cylindrical, and toner is brought into a direct contact with the outer circumferential surface of the conductive elastic layer 14 including cell walls thereof.

The core shaft 12 used in the present invention does not differ particularly from the conventional core shaft. The core shaft 12 may be formed of a metallic material such as iron.

The conductive elastic layer 14 is formed of polyurethane foam 141, which is impregnated with an electrically conductive polymer and a binder.

The polyurethane foam 141 constituting the substantial part of the conductive elastic layer 14 is open-celled. The foam 141 can be manufactured by stirring a mixture of a compound having at least two active hydrogen atoms and a compound having at least two isocyanate groups together with additives such as a catalyst, a foaming agent and a foam stabilizer by the ordinary method so as to foam and cure the mixture. The compound having at least two active hydrogen atoms includes, for example, a polyol used as a raw material of the general polyurethane foam, such as a polyether polyol, a polyester polyol, and polyether ester polyol, having a hydroxyl group at its both terminals. It is also possible to use a polymer polyol as the compound having at least two active hydrogen atoms. On the other hand, the compound having at least two isocyanate groups includes, for example, a polyisocyanate used as a raw material of the general polyurethane foam such as tolylene diisocyanate (TDI) or 4,4-diphenyl methane diisocyanate (MDI). It is also possible to use a mixture and a modified material of these polyisocyanates as a compound having at least two isocyanate groups. The density and the hardness of the polyurethane foam can be set optionally in accordance with the situation of the use. However, it is desirable for the polyurethane foam to have an average cell diameter falling within a range of 50 $\mu$m to 600 $\mu$m as measured in accordance with JIS 6400. Further, it is desirable for the conductive elastic layer 14 to have a thickness falling within a range of 1 mm to 10 mm. The expansion ratio of the polyurethane foam may be about 15 to 50 (density: 20 to 60 kg/m$^3$), preferably 18 to 35 (30 to 55 kg/m$^3$).

In the present invention, an electrically conductive polymer is contained in the cells of the polyurethane foam together with the binder, as described above. The conductive polymer used in the present invention includes, for example, a polyaniline polymer, a polyaniline sulfonic acid polymer, polypyrrol and polyacetylene. These conductive polymers can be used singly or in the form of a mixture of at least two of these polymers. It is desirable to use a polyaniline sulfonic acid polymer as the conductive polymer. These conductive polymers exhibit a resistance of about $10^4$ Ω to about $10^5$ Ω.

The binder used in the present invention includes, for example, acryl-based resins such as an acrylic resin, a polyacrylic acid ester resin, an acrylic acid-styrene copolymer resin, an acrylic acid-vinyl acetate copolymer resin as well polyvinyl alcohol, polyacrylamide, polyvinyl chloride resin, urethane resin, vinyl acetate resin, butadiene resin, epoxy resin, alkyd resin, melamine resin, and chloroprene rubber. These binders can be used singly or in the form of a mixture of at least two of these materials. It is impossible for the conductive polymer, when used singly, to be bonded strongly to the cell walls of the polyurethane foam. However, in the case of using a binder together with the conductive polymer, the conductive polymer is strongly attached to the cell walls of the polyurethane foam so as to form a stable conductive layer within the cells of the polyurethane foam.

In order to permit the conductive polymer and the binder to be contained in the cells of the polyurethane foam, an impregnating solution is prepared by dispersing, for example, a powdery conductive polymer and a binder together with other additives such as a mineral oil anti-foaming agent, a silicone anti-foaming agent and a surfactant, as required, in water or an organic solvent, followed by dipping the polyurethane foam in the impregnating solution so as to impregnate the cells of the polyurethane foam with the impregnating solution. Incidentally, the additives exemplified above are attached to the polyurethane foam together with the conductive polymer and the binder. Then, the polyurethane foam is taken out of the impregnating solution, followed by compressing the polyurethane foam so as to remove the excessive impregnating solution and subsequently removing water, etc., by heating and drying the polyurethane foam. As a result, the conductive polymer is fixed within the cells of the polyurethane foam together with the binder. Incidentally, the impregnating solution can be conveniently prepared by using the binder in the form of a latex or an emulsion in water or an organic solvent, to which an electrically conductive polymer, etc., are added.

It has been found that it is desirable for the conductive elastic layer 14 not to have a covering layer. In other words, it is desirable for the polyurethane constituting the polyurethane foam to be exposed to the outer circumferential surface. If the polyurethane is exposed to the outer circumferential surface, it is possible to suppress significantly the change with time in the charging amount on the surface of the conductive elastic layer 14.

Figure 2:
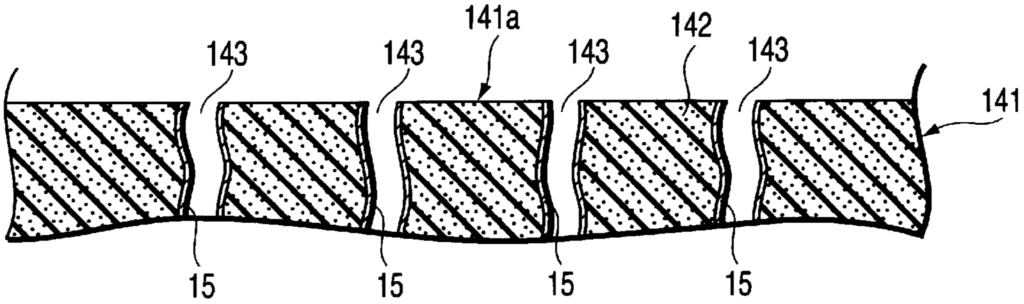
FIG. 2 is a cross-sectional view schematically showing a part of an electrically conductive elastic layer in the toner supply roller according to one embodiment of the present invention.

To be more specific, FIG. 2 is a cross-sectional view showing in an exaggerated fashion a part of the conductive elastic layer 14. As shown in the drawing, a layer 15 including an electrically conductive polymer and a binder is formed within open cells 143, and polyurethane 142 constituting the polyurethane foam 141 is exposed to an outer circumferential surface 141*a*. The open cells 143 are open to the outside on the outer circumferential surface 141*a* and extends to reach the inner circumferential surface of the conductive elastic layer so as to be open in the inner circumferential surface. In the conductive elastic layer 14 of the particular construction, an electrically conductive material layer is not formed on the outer circumferential surface so as to permit the polyurethane to be exposed to the outside, and a layer containing an electrically conductive polymer and a binder is formed within the open cells of the polyurethane foam. Therefore, even if the outer circumferential surface of the conductive elastic layer 14 is scraped off by the toner, the charging amount on the outer circumferential surface is scarcely changed because an electrically conductive polymer is present in the open cells extending to reach the inner circumferential surface of the conductive elastic layer 14. It follows that the change with time in the charging amount on the surface is significantly decreased.

In order to prepare a toner supply roller having the particular conductive elastic layer, preferably the block of the polyurethane foam is impregnated with the impregnating solution described above, followed by taking the polyurethane foam block out of the impregnating solution and subsequently removing the excessive impregnating solution from the polyurethane foam block, as in the impregnating method described above. Further, water, etc., are removed from the polyurethane foam block by the heating for drying. Then, a hole for inserting a core shaft is formed by the punching through the polyurethane foam block impregnated with the conductive polymer and the binder. Further, a core shaft coated with an adhesive is inserted into the hole of the polyurethane foam, followed by polishing the block of the polyurethane foam so as to form the conductive elastic layer 14 having a uniform thickness. By this polishing, a continuous conductive polymer layer is eliminated from the surface of the conductive elastic layer 14.

It is desirable for the conductive elastic layer 14 included in the toner supply roller of the present invention to have a surface resistance falling within a range of $10^5$ Ω to $10^{10}$ Ω, more desirably $10^6$ Ω to $10^8$ Ω.

In the present invention, it is desirable for the weight ratio of the binder to the conductive polymer contained in the polyurethane foam, i.e., binder/conductive polymer ratio, to fall within a range of 0.1 to 10. Where the total attaching amount of the conductive polymer and the binder, i.e., the value of (A/B×100), where A represents the total attaching amount of the binder and the conductive polymer and B represents the weight of the polyurethane foam before impregnation with the impregnating solution, is set constant, the surface resistance of the conductive elastic layer can be controlled at a desired value by changing the binder/conductive polymer ratio. Where the binder/conductive polymer ratio is smaller than 0.1, the adhesivity of the conductive polymer to the polyurethane foam tends to be rendered insufficient. On the other hand, where the binder/conductive polymer ratio exceeds 10, the surface resistance of the resultant elastic conductive layer tends to be rendered unstable. Incidentally, the total amount of the binder and the conductive polymer can be obtained by subtracting the weight of the polyurethane foam before impregnation with the impregnating solution from the weight of the polyurethane foam after impregnation with the impregnating solution.

In the present invention, it is desirable for the total attaching rate of the conductive polymer and the binder defined as above to fall within a range of 5% to 18%. If the total attaching rate falls within a range of 5% to 18%, the change in the surface resistance of the resultant conductive elastic layer is more suppressed. Incidentally, if the total attaching rate exceeds 18%, the hardness (F hardness) of the resultant conductive elastic layer tends to be rendered excessively high. Also, where the total attaching rate of the conductive polymer and the binder falls within a range of 5% to 18%, it is possible to manufacture a desired conductive elastic layer in which the cells of the polyurethane foam are not substantially closed.

It is desirable for the conductive polymer to be attached in an amount of 0.2 to 14% based on the weight of the polyurethane foam.

Described in the following are Examples of the present invention. Needless to say, the present invention is not limited to the following Examples.

EXAMPLES 1 TO 4

An impregnating solution was prepared by dispersing Diyanal MX-1845 (trade name of an acrylic resin manufactured by Mitsubisi Rayon K.K.) used as a binder and Aqua Pass 01 (trade name of a polyaniline sulfonic acid polymer manufactured by Mitsubishi Rayon K.K.) used as an electrically conductive polymer in water in a ratio shown in Table 1. Then, a polyurethane foam having an average cell diameter of 570 μm, a density of 35 kg/m$^3$ and an F hardness of 42 to 50°, which was in the form of a rectangular block of size 25 mm×25 mm×300 mm, was dipped in a bath filled with the impregnating solution thus prepared. The polyurethane foam block dipped in the impregnating solution was compressed between two rolls, followed by releasing the polyurethane foam block so as to permit the polyurethane foam to be impregnated with the impregnating solution. The impregnated polyurethane foam block was guided onto a region above the bath and passed through the clearance between nip rolls so as to remove excess impregnating solution, followed by heating the polyurethane foam block at 80° C. so as to dry the block, thereby obtaining an electrically conductive polyurethane foam. Incidentally, the total attaching rate of the conductive polymer and the binder was controlled by controlling the pressure in compressing the polyurethane foam block taken out of the impregnating solution or by changing the concentrations of the conductive polymer and the binder in the impregnating solution.

A hole for inserting a core shaft was punched through the resultant polyurethane foam block impregnated with the conductive polymer and the binder, followed by inserting a metallic core shaft having a diameter of 6 mm and a length of 210 mm and coated with an adhesive into the hole punched through the polyurethane foam block and subsequently polishing the polyurethane foam block so as to form an electrically conductive elastic layer having a uniform thickness of 4 mm, thereby manufacturing a toner supply roller.

Figure 3:
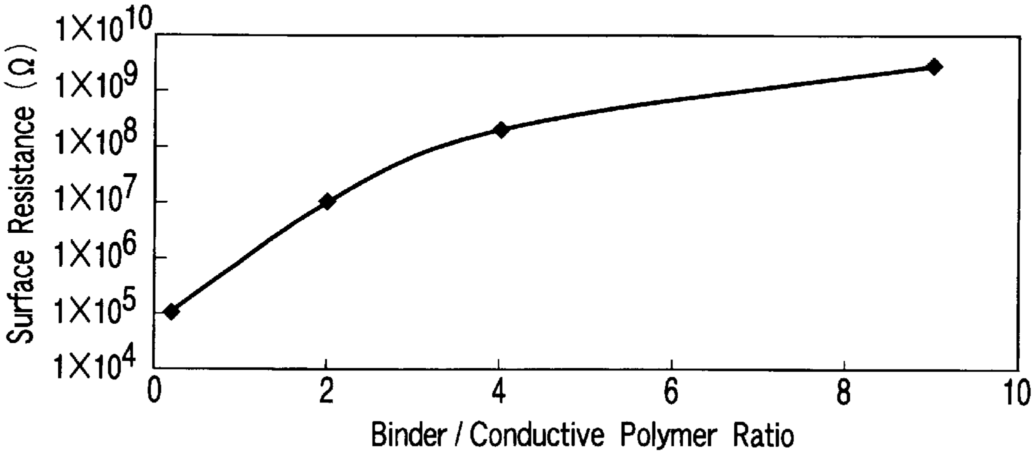
FIG. 3 is a graph showing a relationship between a binder/conductive polymer ratio in an electrically conductive elastic layer and a surface resistance of the conductive elastic layer in respect of a toner supply roller according to one embodiment of the present invention.

The resistance of the elastic conductive layer of each of the toner supply rollers thus manufactured was measured for 10 seconds under a voltage of 10V by using a Hiresta IP MCP-HT260 HA type probe (trade name of a resistance meter manufactured by Mitsubishi Chemical Co., Ltd.). The resistance was measured at four points (measuring point 1: right edge portion; measuring point 2: 70 mm from the right edge; measuring point 3: 140 mm from the right edge; measuring point 4: left edge portion) for each of the toner supply rollers. Table 1 also shows the results. Further, FIG. 3 is a graph showing the relationship between the binder/conductive polymer ratio shown in Table 1 and the surface resistance.

TABLE 1

Relationship between Binder/Conductive Polymer Ratio and Surface Resistance

| Ex. | Binder/Cond. Polymer Ratio | Attaching Rate (%) Binder | Cond. Polymer | Total Attaching Rate | Surface Resistance (Ω) Measuring Point 1 | Measuring Point 2 | Measuring Point 3 | Measuring Point 4 | Average |
|---|---|---|---|---|---|---|---|---|---|
| 1 | 0.2 | 1.0 | 5.0 | 6.0 | $2 \times 10^5$ | $1 \times 10^5$ | $1 \times 10^5$ | $1 \times 10^5$ | $1 \times 10^5$ |
| 2 | 2.4 | 4.4 | 1.8 | 6.2 | $1 \times 10^7$ | $1 \times 10^7$ | $2 \times 10^7$ | $1 \times 10^7$ | $1 \times 10^7$ |
| 3 | 4.2 | 5.0 | 1.2 | 6.2 | $2 \times 10^8$ | $3 \times 10^8$ | $2 \times 10^8$ | $2 \times 10^8$ | $2 \times 10^8$ |
| 4 | 8.6 | 6.0 | 0.7 | 6.7 | $3 \times 10^9$ | $3 \times 10^9$ | $2 \times 10^9$ | $3 \times 10^9$ | $3 \times 10^9$ |

As apparent from Table 1 and FIG. 3, the conductive elastic layer included in the toner supply roller of the present invention is small in the change in the surface resistance among the measuring points. In other words, the conductive elastic layer has a uniform surface resistance. Also, as apparent from Table 1 and FIG. 3, where the total attaching rate of the conductive polymer and the binder is substantially constant, it is possible to control the surface resistance of the conductive elastic layer at a desired value within a range of $10^5$ Ω to $10^{10}$ Ω by changing the binder/conductive polymer ratio.

EXAMPLES 5–17

Figure 4:
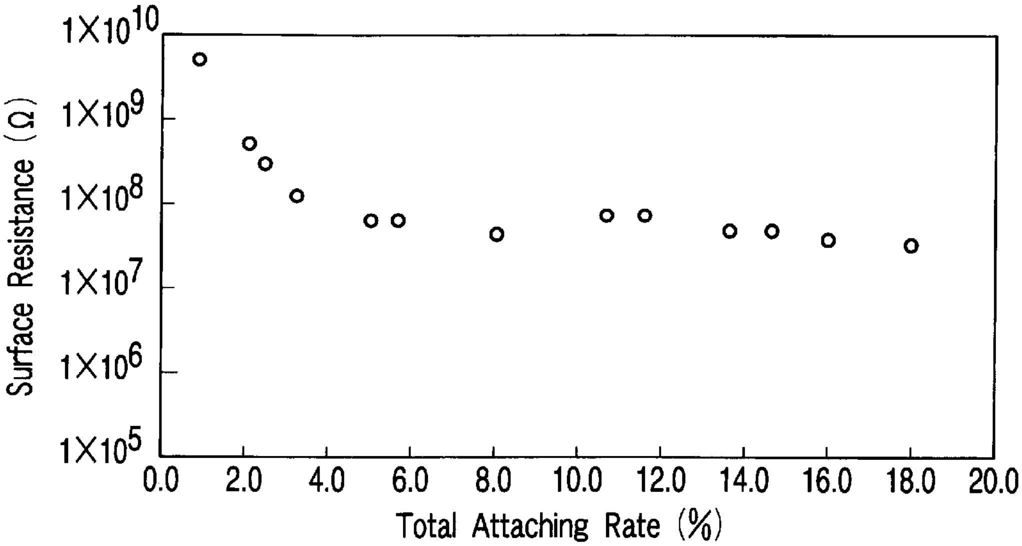
FIG. 4 is a graph showing a relationship between the total attaching rate of a binder and an electrically conductive polymer in an electrically conductive elastic layer and a surface resistance of the conductive elastic layer in respect of a toner supply roller according to one embodiment of the present invention.

A toner supply roller was prepared as in Example 1 and the surface resistance of the conductive elastic layer of the toner supply roller was measured as in Example 1, except that the ratio of the binder to the conductive polymer was set constant at 3.00 and that the total attaching rate of the conductive polymer and the binder was changed as shown in Table 2. Table 2 also shows the results. Also, FIG. 4 is a graph showing the relationship between the total attaching rate of the binder and the conductive polymer shown in Table 2 and the surface resistance of the conductive elastic layer.

TABLE 2

Relationship between Total Attaching Rate of Binder and Conductive Polymer and Surface Resistance

| Ex. | Attaching Rate to Polyurethane foam (%) Bind. | Cond. Polym. | Total Attaching Rate (%) | Surface Resistance (Ω) Measuring Point 1 | 2 | 3 | 4 | Av. |
|---|---|---|---|---|---|---|---|---|
| 5 | 0.6 | 0.2 | 0.8 | $5 \times 10^9$ | $4 \times 10^9$ | $5 \times 10^9$ | $6 \times 10^9$ | $5 \times 10^9$ |
| 6 | 1.5 | 0.5 | 2.0 | $5 \times 10^8$ | $4 \times 10^8$ | $5 \times 10^8$ | $6 \times 10^8$ | $5 \times 10^8$ |
| 7 | 1.8 | 0.6 | 2.4 | $3 \times 10^8$ | $2 \times 10^8$ | $4 \times 10^8$ | $3 \times 10^8$ | $3 \times 10^8$ |
| 8 | 2.4 | 0.8 | 3.2 | $1 \times 10^8$ | $2 \times 10^8$ | $1 \times 10^8$ | $1 \times 10^8$ | $1 \times 10^8$ |
| 9 | 3.8 | 1.3 | 5.1 | $6 \times 10^7$ | $6 \times 10^7$ | $6 \times 10^7$ | $6 \times 10^7$ | $6 \times 10^7$ |
| 10 | 4.2 | 1.4 | 5.6 | $6 \times 10^7$ | $6 \times 10^7$ | $6 \times 10^7$ | $6 \times 10^7$ | $6 \times 10^7$ |
| 11 | 6.0 | 2.0 | 8.0 | $3 \times 10^7$ | $5 \times 10^7$ | $4 \times 10^7$ | $5 \times 10^7$ | $4 \times 10^7$ |
| 12 | 8.0 | 2.7 | 10.7 | $8 \times 10^7$ | $6 \times 10^7$ | $8 \times 10^7$ | $7 \times 10^7$ | $7 \times 10^7$ |
| 13 | 8.7 | 2.9 | 11.6 | $7 \times 10^7$ | $8 \times 10^7$ | $8 \times 10^7$ | $6 \times 10^7$ | $7 \times 10^7$ |
| 14 | 10.2 | 3.4 | 13.6 | $5 \times 10^7$ | $4 \times 10^7$ | $5 \times 10^7$ | $5 \times 10^7$ | $5 \times 10^7$ |
| 15 | 11.0 | 3.7 | 14.6 | $5 \times 10^7$ | $5 \times 10^7$ | $5 \times 10^7$ | $5 \times 10^7$ | $5 \times 10^7$ |
| 16 | 12.0 | 4.0 | 16.0 | $4 \times 10^7$ | $4 \times 10^7$ | $4 \times 10^7$ | $4 \times 10^7$ | $4 \times 10^7$ |
| 17 | 13.5 | 4.5 | 18.0 | $2 \times 10^7$ | $4 \times 10^7$ | $4 \times 10^7$ | $4 \times 10^7$ | $4 \times 10^7$ |

As apparent from Table 2 and FIG. 4, the conductive elastic layer included in the toner supply roller of the present invention is small in the change in surface resistance between the measuring points. In other words, the conductive elastic layer has a uniform surface resistance. Also, as apparent from Table 2 and FIG. 4, where the binder/conductive polymer ratio is substantially the same, it is possible to obtain a substantially constant surface resistance in the case where the total attaching rate of the conductive polymer and the binder falls within a range of 5% to 18%.

EXAMPLE 18

An impregnating solution was prepared by dispersing Diyanal MX-1845 (trade name of an acrylic resin manufactured by Mitsubisi Rayon K.K.) used as a binder and Aqua Pass 01 (trade name of a polyaniline sulfonic acid polymer manufactured by Mitsubishi Rayon K.K.) used as an electrically conductive polymer in water in a binder/conductive polymer ratio of 3.0. Then, a polyurethane foam having an average cell diameter of 570 μm, a density of 35 kg/m$^3$ and an F hardness of 42 to 50°, which was in the form of a rectangular block of size 25 mm×25 mm×300 mm, was dipped in a bath filled with the impregnating solution thus prepared. The polyurethane foam block dipped in the impregnating solution was compressed between two rolls, followed by releasing the polyurethane foam block so as to permit the polyurethane foam to be impregnated with the impregnating solution. The impregnated polyurethane foam block was guided onto a region above the bath and passed through the clearance between nip rolls so as to remove excess impregnating solution, followed by heating the polyurethane foam block at 80° C. so as to dry the block, thereby obtaining an electrically conductive polyurethane foam. The binder attaching rate of the conductive polyurethane foam was found to be 4.9%, the attaching rate of the conductive polymer was found to be 1.6%, and the total attaching rate of the binder and the conductive polymer was found to be 6.5%. Incidentally, the total attaching rate of the conductive polymer and the binder was controlled by changing the compressing pressure applied to the polyurethane foam block taken out of the impregnating solution or by changing the concentrations of the conductive polymer and the binder in the impregnating solution.

A hole for inserting a metallic core shaft was punched through the resultant polyurethane foam block impregnated with the conductive polymer and the binder, followed by inserting a metallic core shaft having a diameter of 6 mm and a length of 210 mm and coated with an adhesive into the hole punched through the polyurethane foam block and subsequently polishing the polyurethane foam block so as to form an electrically conductive elastic layer having a uniform thickness, thereby manufacturing a toner supply roller of the present invention.

On the other hand, the entire circumferential surface of an electrically conductive elastic layer of a toner supply roller manufactured like the toner supply roller of the present invention was coated with the impregnating solution prepared as described above, followed by drying the impregnating solution layer thus formed, thereby preparing another toner supply roller. The binder attaching rate, the conductive polymer attaching rate and the total attaching rate in the surface layer of the toner supply roller thus manufactured were adjusted to be equal to the binder attaching rate, the conductive polymer attaching rate and the total attaching rate for the toner supply roller of the present invention in which the polyurethane foam block was impregnated with the binder and the conductive polymer.

The toner supply rollers thus manufactured were mounted on a DP560 printer (trade name of a positive charging type printer manufactured by Kyocera Mita K.K.) and a V930 printer (trade name of a negative charging type printer manufactured by Murata Kikai K.K.) so as to measure the toner charging amount as follows. Incidentally, the outer diameter of the toner supply roller was adjusted to conform with the kind of the printer used, i.e., 14.3 mm for the DP560 and 13.9 mm for the V930.

<Measurement of Charging Amount>

(1) Number of times of testing:

The same kind of three toner supply rollers were tested for each kind of the printer.

(2) Storage of toner cartridge:

The toner cartridge was stored for 24 hours or more within a room having a temperature of 20 to 22° C. and a relative humidity of 60% so as to control the temperature and humidity of the toner cartridge. The measuring test of the toner charging amount was performed within a test room having the same atmosphere.

(3) Procedure for measuring toner charging amount and for calculating toner charging rate:

(a) The weight of the cartridge after the storage is measured for ascertaining the residual amount of toner. Where the toner residual amount is not larger than 50%, a new toner cartridge is substituted for the used toner cartridge.

(b) An image confirming image by the pattern stored in one kind of the printer is consecutively printed on four sheets of A4 paper for a single toner supply roller.

(c) The toner charging amount is measured after process (b) given above. In this case, the developing roller is exposed to the outside, and the toner present on the circumferential surface of the developing roll down to the contact section with the photosensitive body downstream of the toner regulating blade is sucked and collected so as to measure the charging amount and the weight of the collected toner. The toner charging amount is measured by using a 210-2AHS charging amount measuring apparatus manufactured by Trek, and the weight of the toner is measured by using an M1-221 electron balance manufactured by Zaltorium. The charging amount per gram of the toner (toner charging rate) is calculated by dividing the charging amount of the toner by the weight of the toner.

(d) The image is printed on a single sheet of A4 paper after process (c) given above, and the toner charging rate is calculated as in process (c).

(e) The image is printed on a single sheet of A4 paper after process (d) given above, and the toner charging rate is calculated as in process (c).

(f) The toner charging rates measured in processes (c) to (e) given above are averaged so as to record the average value as the initial toner charging rate for a single roller.

(g) The image is consecutively printed on 2,000 sheets of A4 paper after process (e) given above so as to calculate the toner charging rate as in process (c). The toner charging rate thus calculated is recorded as the toner charging rate after the consecutive printing for a single toner supply roller.

(h) The processes (a) to (g) given above are repeated for each of the two residual toner supply rollers so as to calculate the initial toner charging rate and the toner charging rate after consecutive printing. The initial toner charging rate and the charging rate after consecutive printing thus calculated are recorded.

(i) The initial toner charging rates and the toner charging rates after consecutive printing are averaged separately so as to obtain the average initial toner charging rate and the average toner charging rate after consecutive printing, which are recorded.

<Result of Measurement>

Table 3 shows the results.

TABLE 3

| Printer | Surface Layer | Average Charging Rate ($\mu$C/g) Initial | After Consecutive Printing | Amount of Change in Charging Rate ($\mu$C/g) |
|---|---|---|---|---|
| DP560 | Present | 27.8 | 36.9 | 9.1 |
| | None | 29.4 | 31.3 | 1.9 |
| V930 | Present | −13.3 | −15.7 | −2.4 |
| | None | −14.6 | −15.8 | −1.2 |

As apparent from Table 3, the initial toner charging rate is greatly changed after consecutive printing in the toner supply roller comprising a coated surface layer containing an electrically conductive polymer. However, the toner supply roller in which polyurethane is exposed to the outside retains a toner charging rate substantially equal to the initial toner charging rate even after consecutive printing, showing that the change with time in the surface charging amount is significantly small in this toner supply roller.

Additional advantages and modifications will readily occur to those skilled in the art. Therefore, the present invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A toner supply roller comprising a core shaft and an electrically conductive elastic layer formed on a outer peripheral surface of the shaft, the conductive elastic layer comprising an open-cell polyurethane foam, wherein an electrically conductive polymer and a binder are attached to cell walls of the polyurethane foam.

2. The toner supply roller according to claim 1, wherein the conductive polymer is selected from the group consisting of a polyaniline polymer, a polyaniline sulfonic acid polymer, polypyrrol, polyacetylene and a mixture thereof.

3. The toner supply roller according to claim 1, wherein the binder is selected from the group consisting of acryl-based resins such as an acrylic resin, a polyacrylic acid ester resin, an acrylic acid-styrene copolymer resin, an acrylic acid-vinyl acetate copolymer resin as well polyvinyl alcohol, polyacrylamide, polyvinyl chloride resin, urethane resin, vinyl acetate resin, butadiene resin, epoxy resin, alkyd resin, melamine resin, chloroprene rubber and a mixture thereof.

4. The toner supply roller according to claim 1, wherein the conductive polymer and the binder are attached to the cell walls of the polyurethane foam in a total amount of 5 to 18% by weight based on the amount of the polyurethane foam.

5. The toner supply roller according to claim 1, wherein the weight ratio of the binder to the conductive polymer falls within a range of 0.1 to 10.

6. The toner supply roller according to claim 1, wherein the polyurethane constituting the polyurethane foam is exposed to the outer circumferential surface of the conductive elastic layer.

7. The toner supply roller according to claim 6, wherein the conductive polymer is selected from the group consisting of a polyaniline polymer, a polyaniline sulfonic acid polymer, polypyrrol, polyacetylene and a mixture thereof.

8. The toner supply roller according to claim 6, wherein the binder is selected from the group consisting of acryl-based resins such as an acrylic resin, a polyacrylic acid ester resin, an acrylic acid-styrene copolymer resin, an acrylic acid-vinyl acetate copolymer resin as well polyvinyl alcohol, polyacrylamide, polyvinyl chloride resin, urethane resin, vinyl acetate resin, butadiene resin, epoxy resin, alkyd resin, melamine resin, chloroprene rubber and a mixture thereof.

9. The toner supply roller according to claim 6, wherein the conductive polymer and the binder are contained in cells, and attached to cell walls of, the polyurethane foam in a total amount of 5 to 18% by weight based on the amount of the polyurethane foam.

10. The toner supply roller according to claim 6, wherein the weight ratio of the binder to the conductive polymer falls within a range of 0.1 to 10.

* * * * *